(12) United States Patent
Urich et al.

(10) Patent No.: US 9,540,780 B2
(45) Date of Patent: Jan. 10, 2017

(54) POT BEARING

(71) Applicant: Mageba S.A., Bulach (CH)

(72) Inventors: Bernd Urich, Eglisau (CH); Simon Hoffmann, Constance (DE); Thomas Spuler, Dielsdorf (CH)

(73) Assignee: Mageba S.A., Bulach (CH)

( * ) Notice: Subject to any disclaimer, the term of this patent is extended or adjusted under 35 U.S.C. 154(b) by 0 days.

(21) Appl. No.: 14/867,203

(22) Filed: Sep. 28, 2015

(65) Prior Publication Data

US 2016/0017553 A1   Jan. 21, 2016

Related U.S. Application Data

(63) Continuation of application No. PCT/EP2014/000838, filed on Mar. 28, 2014.

(30) Foreign Application Priority Data

Mar. 28, 2013 (EP) .................................... 13001633

(51) Int. Cl.
*E01D 19/04* (2006.01)
*F16C 29/00* (2006.01)

(52) U.S. Cl.
CPC ............ *E01D 19/047* (2013.01); *F16C 29/002* (2013.01)

(58) Field of Classification Search
CPC .............................. F16C 29/002; E01D 19/047
See application file for complete search history.

(56) References Cited

U.S. PATENT DOCUMENTS

| | | | | |
|---|---|---|---|---|
| 3,995,915 A | * | 12/1976 | Koster | E01D 19/047 14/73.5 |
| 3,998,499 A | * | 12/1976 | Chiarotto | E01D 19/047 267/152 |
| 4,006,505 A | * | 2/1977 | Koster | F16H 33/02 14/73.5 |
| 4,172,600 A | | 10/1979 | Koster et al. | |
| 4,928,339 A | * | 5/1990 | Klawe | E01D 19/047 14/73.5 |
| 4,955,098 A | * | 9/1990 | Bayer | C08K 3/04 14/73.5 |

(Continued)

FOREIGN PATENT DOCUMENTS

DE    27 25 621 B1    9/1978
DE    10 2008 017323 A1    10/2009

(Continued)

OTHER PUBLICATIONS

International Search Report, with Written Opinion, for corresponding International Patent Application No. PCT/EP2014/000838 mailed on Aug. 5, 2014.

(Continued)

*Primary Examiner* — Thomas R. Hannon
(74) *Attorney, Agent, or Firm* — Myers Wolin, LLC (57) ABSTRACT

A pot bearing is provided for absorbing rotations with little constraint, comprising a pot, an elastomer cushion accommodated therein and a cover projecting at least partially into the pot and supported on said cushion. The elastomer cushion is slidingly sealed off from the pot, around the edge beneath the cover by means of a circumferential inner seal, which consists entirely or at least primarily of acetal with a melt flow index (MFI 190/2.16) of less than 6 g/10 min.

24 Claims, 5 Drawing Sheets

(56) References Cited

U.S. PATENT DOCUMENTS 5,466,068 A * 11/1995 Andra .................. E01D 19/048
14/73.5
2003/0091247 A1 * 5/2003 Yen ..................... E01D 19/047
384/36

FOREIGN PATENT DOCUMENTS

EP  0 333 893 A1 9/1989
WO  2006/042571 A1 4/2006

OTHER PUBLICATIONS

Braun et al., "Structural bearings—Part 5: Pot bearings", Stahlbau, DIN EN 1337-5, vol. 78, issue 11, pp. 849-868, Ernst & Sohn, Berlin, Germany, Nov. 17, 2009.
Eggert et al., "Lager im Bauwesen (2nd Edition)", Chapter 7, Item 7.3.2.4: Long-term Tipping Test, pp. 538-544, Ernst & Sohn, Berlin, Germany, Dec. 28, 1995.

\* cited by examiner

POT BEARING

CROSS REFERENCE TO RELATED APPLICATIONS

This application is a continuation under 35 U.S.C. §120 of International Application PCT/EP2014/000838, filed Mar. 28, 2014, which claims priority to European Application 13001633.0, filed Mar. 28, 2013, the contents of each of which are incorporated by reference herein.

FIELD OF THE INVENTION

The present invention relates to a pot bearing for absorbing rotations while imposing only small constraints, with a pot, an elastomer cushion accommodated therein and a cover braced thereon and protruding at least partly into the pot, wherein the rim of the elastomer cushion is sealed slidingly relative to the pot underneath the cover by means of a circumferential inner seal, which preferably consists of chain members linked with one another.

BACKGROUND

Pot bearings of the foregoing type are known and in use especially for applications in structural engineering. They permit—making them superior to diverse other conventional bearings—in a particularly compact structure, bracing of a supported component on a load-bearing component, in a manner suitable for transmission of large loads, in the case of varying—within certain limits—inclinations of the two components relative to one another, especially due to tilting ("rotation") of the cover relative to the pot. A pertinent document for structural engineering applications of pot bearings is DIN "Bearings in Construction—Part 5: Pot bearings", i.e. DIN EN 1337-5, the contents of which are incorporated by reference herein. The patent literature, for example DE 2725621 C2, also relates to the design of pot bearings.

To permit the cover to become inclined relative to the pot (i.e. to tilt or "rotate" around a generally horizontal axis), it is imperative to provide a circumferential annular gap between the cover and the pot. Precisely in pot bearings subjected to particularly high stress, sealing of the elastomer cushion relative to the pot underneath the cover takes on particular importance to ensure that the elastomer cushion does not flow through that annular gap or be pressed out of the associated cavity. According to the pertinent standard (DIN EN 1337-5), brass, polyoxymethylene (POM), carbon-filled PTFE and stainless steel can be considered as material for the inner seal in question. In the case of use of POM, the standard specifies providing a POM sealing chain consisting of individual elements engaging in one another, wherein the POM to be used has a density (according to ISO 1183, incorporated by reference herein) of 1410 kg/m$^3$±20 kg/m$^3$, a melt flow index MFI 190/2.16 (according to EN ISO 1133, incorporated by reference herein) of (corrected!) 10 g/10 min±2 g/10 min, a tensile strength (according to EN ISO 527-2, incorporated by reference herein) of >=62 N/mm$^2$ and an elongation at break (according to EN ISO 527-2, incorporated by reference herein) of >=30%. Furthermore, the production of the inner seal in question from UHMWPE (see WO 2006/042571 A1) has been proposed as an alternative.

The object of the present invention is to provide a pot bearing of the type mentioned in the introduction that is characterized by a performance further improved compared with the bearings with POM inner seal according to the standard.

SUMMARY

This object is achieved according to the present invention by a pot bearing of the class in question in which the inner seal, i.e. especially an inner seal ring (possibly consisting of a plurality of segments) or the chain members of a sealing chain linked with one another consists entirely or at least predominantly of polyoxymethylene with a melt flow index (MFI 190/2.16) of smaller than 6 g/10 min. This phrase "predominantly of polyoxymethylene . . . " is used in particular to indicate, for example, that a structural component of a different material (for example a core of carbon fiber or the like) may be embedded in an inner seal ring. In a particularly preferred improvement, the melt flow index (MFI 190/2.16) of the polyoxymethylene of the inner seal ring or of the chain members of the inner seal linked to one another is smaller than 4 g/10 min.

The present invention is based on the knowledge that attention must be paid most particularly to the design of the inner seal in question to achieve even more pronounced and diverse performance of pot bearings of the type under consideration here than has been the case heretofore. In this respect, the present invention considers especially the knowledge that the most diverse practice-oriented properties and characteristics of pot bearings are related directly or at least indirectly to the design of the inner seal in question. However, this especially is true not only (see hereinafter) for the useful life of the pot bearing, for which the permissible cumulative sliding distance of the seal (against the pot) represents a criterion. The fact is that the sliding distance (during a considered angle of tilting or rotation, such as ±0.0035, for example; see H. Eggert et al., Lager im Bauwesen [Bearings in Construction], 2nd Edition) is larger the larger the diameter of the pot is. This in turn has the consequence that, if the inner seal dictates the maximum permissible pressure (i.e. the maximum permissible force per unit area) within the elastomer cushion, the diameter of the pot must be correspondingly increased for higher loads, which in turn, because the sliding distance increases in proportion thereto during tilting of the cover, tends to shorten the useful life (in the sense of a reduced number of permissible tilting movements) precisely for high-performance pot bearings. In other respects, further variables dependent on the design of the inner seal are also relevant for diverse practical applications, especially restoring forces or restoring moments during tilting of the supported component (see H. Eggert et al., loc. cit.).

During application of the present invention, i.e. during use of polyoxymethylene with a melt flow index (MFI 190/2.16) of smaller than 8 g/10 min for the production of the inner seal of pot bearings of the class in question, it is possible to provide inner seals that withstand the significantly increased pressures within the elastomer cushion and reliably perform their sealing function under correspondingly increased bearing loads, and doing so with direct sliding properties of the pair comprising inner seal and pot that in any case are not impaired but typically are even improved for their part. The increased permissible pressures within the elastomer cushion make it possible to construct pot bearings designed for the highest loads more compactly than in the constructive implementation of DIN EN 1337-5. It is not only from the viewpoint of applications technology that this is a substantial advantage, with the added bonus of a favorable effect on weight and manufacturing costs. For a given number of tilting movements of the cover by a defined tilting angle, the cumulative sliding distance of the inner seal against the pot is actually smaller. This tends to prolong the useful or working life. The fact that, above and beyond this, the permissible cumulative sliding distance for the inner seal can be substantially greater than that according to DIN EN 1337-5, and in particular at loads on the bearing greater than the permissible loads according to DIN EN 1337-5 and accordingly higher forces per unit area within the elastomer cushion, which at first glance, because of the greater pressing force of the inner seal against the pot, would suggest greater rather than lesser wear of the inner seal, is yet another advantage. The fact that POM with a melt flow index substantially reduced compared with DIN EN 1337-5 is suitable for effective sealing of pot bearings subjected to substantially higher loads than provided according to DIN EN 1337-5 is completely surprising, in view of the fact that the inner seal produced from the material used according to the invention conforms less well to the pot because of the smaller melt flow index. As a further aspect with advantages relative to practice in any case for diverse applications, it may be stated that, at the particularly high forces per unit area that are possible within the elastomer cushion during implementation of the present invention—and contrary to the generally accepted notions of incompressibility of the elastomer cushion—reproducible, technically usable yielding capabilities of the pot bearing can be demonstrated, i.e. a certain load-dependent compression of the cover. By virtue of a damping characteristic of the compression and decompression, this is useful for bearing tasks exposed to various, dynamic load fluctuations, such as in bearings for railroad bridges, for example. In such cases a defined, intentional compression of the cover can already be achieved, even with smaller heights of the elastomer cushion, by implementation of the present invention compared with pot bearings designed according to the standard and less capable of withstanding large stresses. The corresponding reduction of the overall height is obviously of great advantage, especially because the area of application of pot bearings of the design in question here is clearly expanded hereby. In connection with the systematic use of compression of the cover, the already mentioned improved sliding and wear behavior of the material used according to the invention for the inner seal comes into play once again since, in this respect, sliding of the inner seal against the pot takes place in addition to the tilting movements of the cover and makes a further contribution to the total cumulative sliding distance. The reproducible load-dependent compression of the cover can in turn be used for a prestressed installation situation of the inventive pot bearing, i.e. the use in applications in which, for a defined dimension of the components relative to one another, a predetermined bearing force is supposed to act or be transmitted.

Incidentally, the demonstrated advantages of the inventive pot bearing are true not only with regard to or compared with DIN EN 1337-5. To the contrary, they are also true with regard to standards that are applicable elsewhere and which are comparable in substantial points (especially the permissible force per unit area within the elastomer cushion) with the requirements of DIN EN 1337-5.

Merely for clarification, it is pointed out once again that the present invention is not limited to certain constructive designs of the inner seal but instead encompasses several diverse configurations, such as, for example, the design as a one-piece seal ring, as a seal ring comprising a plurality of segments joined together, as a sealing chain consisting of chain members linked to one another and the like.

The advantages explained in the foregoing can be achieved to a particularly marked extent when polyoxymethylene with a melt flow index (MFI 190/2.1) of smaller than 4 g/10 min is used for production of the inner seal.

Within the sense of the foregoing explanations of the present invention and of the advantages associated therewith, a first preferred improvement of the inventive pot bearing is characterized in that the permissible force per unit area of the elastomer cushion is greater than the standard value defined and tested according to DIN EN 1337-5. Particularly preferably, the inner seal of inventive pot bearings seals with a force per unit area of the elastomer cushion up to 2 times the maximum standard value according to DIN EN 1337-5. In this sense it was possible to demonstrate a permissible loadability of pot bearings according to the present invention of even greater than 120 N/mm$^2$, without development of detrimental effects on the function and/or useful life. According to another preferred improvement, also within the sense of the foregoing explanations of the present invention and of the advantages associated therewith, the permissible cumulative sliding distance of the inner seal is greater than the standard value defined and tested according to DIN EN 1337-5 and, in fact, particularly preferably is as much as 1.6 times the maximum standard values according to DIN EN 1337-5. In this sense, a cumulative sliding distance of the seal of greater than 3,200 m has not led to perceptible damage in the port bearings according to the present invention even in the case of the high loads of even greater than 120 N/mm$^2$ cited hereinabove. Both characteristics can be achieved by application of the present invention, i.e. by using polyoxymethylene with a melt flow index (MFI 190/2.16) of smaller than 6 g/10 min for production of the inner seal.

Even with regard to further properties related to the inner seal, the pot bearing according to the present invention is superior to those according to DIN EN 1337-5. Thus increased reliability is derived from the fact that the material used according to the invention for production of the inner seal can have a higher tensile strength and/or a larger elongation at break than the POM specified according to DIN EN 1337-5. In this sense, preferred improvements of the present invention are characterized in that such a POM with a melt flow index (MFI 190/2.16) of smaller than 6 g/10 min is used, wherein its tensile strength (EN ISO 527-2) is at least 62 N/mm$^2$ and/or its elongation at break (EN ISO 527-2 is at least 45%.

Incidentally, the material used according to the invention for production of the inner seal is characterized by particularly favorable temperature behavior in the sense that the characteristic properties have relatively little dependence on temperature. In this sense yet another preferred improvement of the present invention is characterized in that the requirements defined in DIN EN 1337-5 are satisfied at temperatures of −40° C. to +50° C. This means that inventive pot bearings can be used particular advantageously in environments with extreme temperature conditions.

In the sense of further improved operating properties of the inventive pot bearing (especially with regard to response behavior, wear and restoring moments), yet another preferred improvement of the present invention is characterized in that the inner seal is provided with silicone grease, especially for initial lubrication, at least in the region of the sealing face against the pot. For this purpose, the use of a lithium-saponified silicone oil based on methyl phenyl silicone oil is particularly favorable. As regards the use in question here, it is particularly preferable to use silicone greases with at least one of the following properties: drop point >200° C. according to DIN ISO 2176 and/or worked penetration of 20-35 mm, especially 25-30 mm, preferably 26.5-29.5 mm according to DIN ISO 2137 and/or flow pressure of <200 hPa at 20° C. according to DIN 51805 and/or oil separation of <1.5%, especially <1% at 40° C. and 18 hours duration according to DIN 51817, all of which standards are incorporated by reference herein.

As regards bonding of the inner seal to the elastomer cushion, several technical options for this can be considered within the scope of the present invention. Thus, according to a first preferred improvement in this respect, the inner seal can be vulcanized into or onto the elastomer cushion. In particular, vulcanization of the inner seal into the elastomer cushion acts in the sense of a particularly long useful life. From the viewpoint of manufacturing technology, however, it may be more favorable, subject to certain prerequisites, to bond the inner seal—according to a second preferred improvement of the invention in this respect—by means of an adhesive to the elastomer cushion. According to yet a third preferred improvement in this respect, the inner seal is vulcanized into an elastomer strip, which in turn is placed around the elastomer cushion. Subject to certain prerequisites, this permits—when direct bonding of the inner seal onto the elastomer cushion may not be possible—optimization of the pot bearing with regard not only to outstanding properties of the elastomer cushion but also to excellent fixation of the inner seal thereto.

The advantages associated with the present invention (see hereinabove) come specifically into play in particularly pronounced manner when different restoring moments around two horizontal axes orthogonal to one another are present in the pot bearing, as is attractive for a series of applications. This can be achieved in particular by a design of the pot in which the cross section is not round, but in particular is oval. Such a design of the pot bearing with a non-round cross section is—especially in the case of the preferred embodiment of the inner seal from a sequence of chain members linked to one another—possible without problems within the scope of the present invention. The particular advantages of pot bearings with different restoring moments in two horizontal axes orthogonal to one another are apparent in applications with different requirements for the tilting behavior in various directions, as are relatively frequent in practice (e.g. in bridge construction). Pots that are non-round in the sense explained in the foregoing make it possible in particular to achieve a particularly favorable load-to-wear ratio, by the fact that the dimension of the pot is smaller in the direction of the primary tilting movement of the cover than it is transverse thereto, so that, when the cross-sectional area of the elastomer cushion is sufficiently large—with regard to the loads to be supported—the sliding distance for specified tilting movements to be assumed is minimized, because the non-round design of the pot additionally permits adaptation of the bearing geometry to the respective installation situation. This make the inventive pot bearing predestined for use in refurbishing projects, in which a worn or defective bearing must be replaced by a new bearing, which satisfies the highest technical requirements and can withstand high loads, without alteration of the geometry of the components, i.e. by retaining the previous installation situation.

Yet another preferred improvement of the present invention is characterized in that the elastomer cushion is annular and surrounds a core structure that constitutes a fixed component of the pot. In particular, this core structure may be of hollow design, which in particular permits the passage of mechanical components through the bearing, such as in particular the passage of tension members, which act as anti-lift safeguards. Such tension members (which are prestressed if necessary) prevent the cover from being raised by an impermissible distance in the presence of possible occurrence of lifting forces on the bearing. Similarly, however, the passage of lines of any desired type and function through the pot bearing is also conceivable for such hollow core structures, for example measuring lines connected to a sensor or probe. A radial seal provided if necessary inside such an annular elastomer cushion and acting to seal it relative to the core structure may in turn consist entirely or at least predominantly of polyoxymethylene with a melt flow index of smaller than 8 g/10 min. The advantages achieved in this case correspond to those explained in the foregoing in connection with the corresponding design of the inner seal. They are incorporated here by reference to avoid repetitions.

For diverse typical applications, for example in bridge construction, the inventive pot bearing—according to yet another preferred improvement—has an additional sliding face, especially with a sliding material of high compressive strength and high sliding resistance. Depending on whether or not a guide is provided, the additional sliding face represents one additional degree of freedom or two additional degrees of freedom, especially for displacement of the two structural parts relative to one another, for example because of expansions. Especially for precisely those applications that typically involve particularly high loads and need particularly long-lasting and reliable bearings, the present invention provides pot bearings that are suitable to the greatest extent. In this improvement in particular, the inventive pot bearing is predestined—within the sense of the use for the structural refurbishing mentioned hereinabove—to replace a bridge rolling bearing that has become worn or is threatened by failure.

According to yet another preferred improvement of the invention, the pot bearing is designed as a pin bearing, in that a chamber that can be charged with curing filling compound via a filling channel is disposed in the pot—in the sense of European Technical Approval ETA-11/0453—underneath the elastomer cushion. The height of the bearing can be adjusted via the degree of filling of the said chamber with filling compound, i.e. it can be adapted to the specific requirements. This is an advantageous viewpoint, especially once again in applications in which an existing bearing will be replaced by a bearing according to the present invention and thus the pot bearing must be adapted—without great time and effort—to the specific installation situation. Incidentally, in connection with such pin bearings, the special aspect of flexibility of the inventive pot bearing explained hereinabove again comes into play. After all, the pot bearing can be installed in prestressed condition without alteration of the surrounding structure, by the fact that the chamber disposed underneath the elastomer cushion is charged with curing filler compound to such a pressure after being mounted that the desired prestress is established within the elastomer cushion.

BRIEF DESCRIPTION OF THE DRAWINGS

To explain or illustrate not only various structural properties applicable for pot bearings but also relationships as described in the foregoing, various alternative embodiments of pot bearings, in connection with which the present invention may be used, are illustrated in the drawing.

DETAILED DESCRIPTION OF THE PREFERRED EMBODIMENTS

Figure 1:
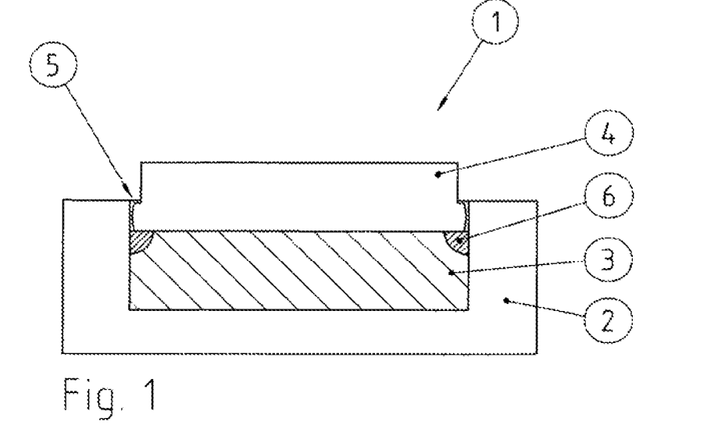
FIG. 1 represents a vertical section through a pot bearing 1 in a first design, which is suitable for implementation of the present invention.
Figure 2:
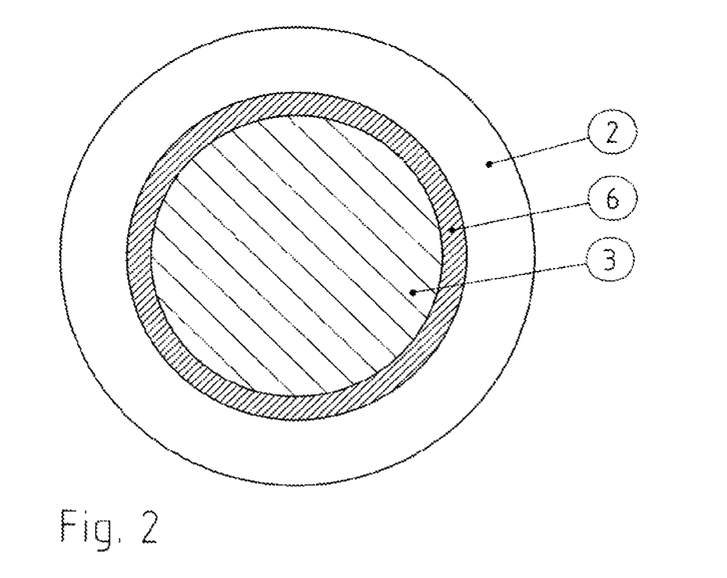
FIG. 2 shows pot bearing 1 according to FIG. 1 in top view from above with cover 4 removed.

FIG. 1 represents a vertical section through a pot bearing 1 in a first design, which is suitable for implementation of the present invention. Therein 2 denotes the pot, 3 the elastomer cushion (elastomeric body), 4 the cover, 5 the annular gap between pot 2 and cover 4, and 6 the inner seal. FIG. 2 shows pot bearing 1 according to FIG. 1 in top view from above with cover 4 removed.

Figure 3:
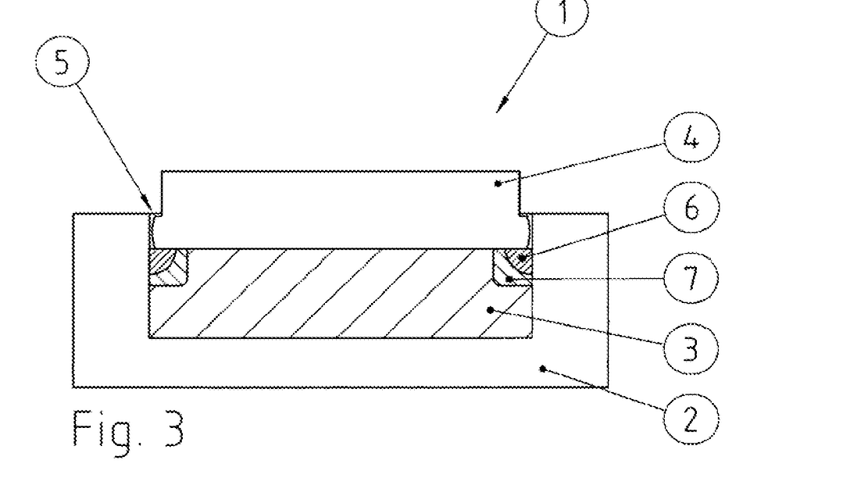
FIG. 3 illustrates a modification of pot bearing 1 shown in FIGS. 1 and 2, wherein inner seal 6 is inserted or vulcanized into an elastomeric strip 7.

FIG. 3 illustrates a modification of pot bearing 1 shown in FIGS. 1 and 2, wherein inner seal 6 is inserted or vulcanized into an elastomeric strip 7, which is placed around elastomer cushion 3.

Figure 4:
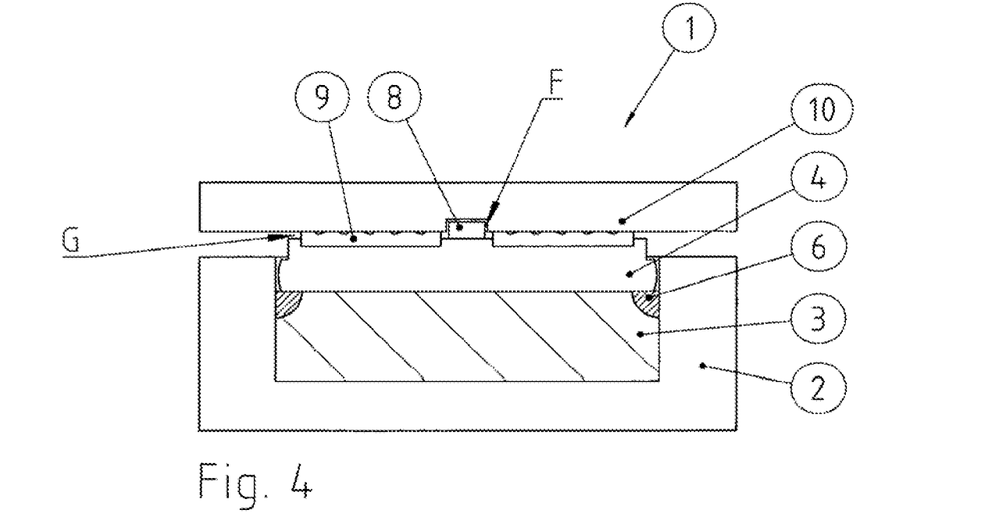
FIG. 4 illustrates a modification of pot bearing 1 shown in FIGS. 1 and 2.

FIG. 4 illustrates a modification of pot bearing 1 shown in FIGS. 1 and 2, wherein an additional sliding face G with exactly one degree of freedom is provided. Therein 8 denotes the guide strip, which is provided on cover 4 and functions as inner guide F for sliding plate 10. A sliding partner 9 is disposed in a manner known in itself between cover 4 and sliding plate 10.

Figure 5:
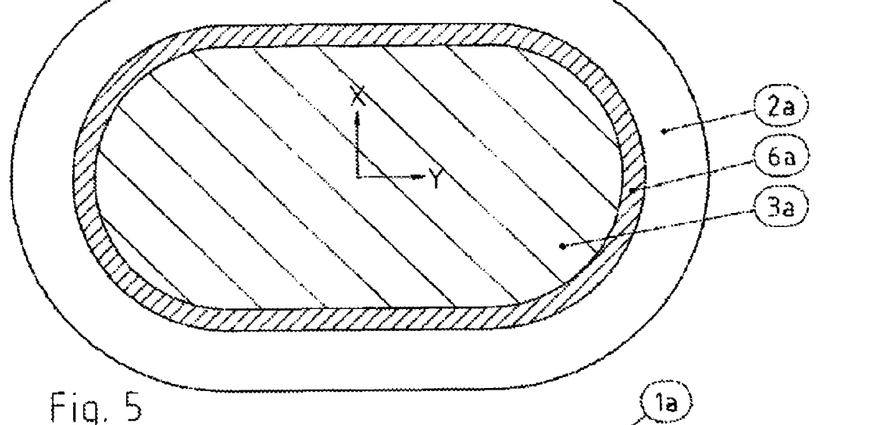
FIGS. 5, 6 and 7 illustrate a modification of pot bearing 1 shown in FIGS. 1 and 2.
Figures 6, 7:
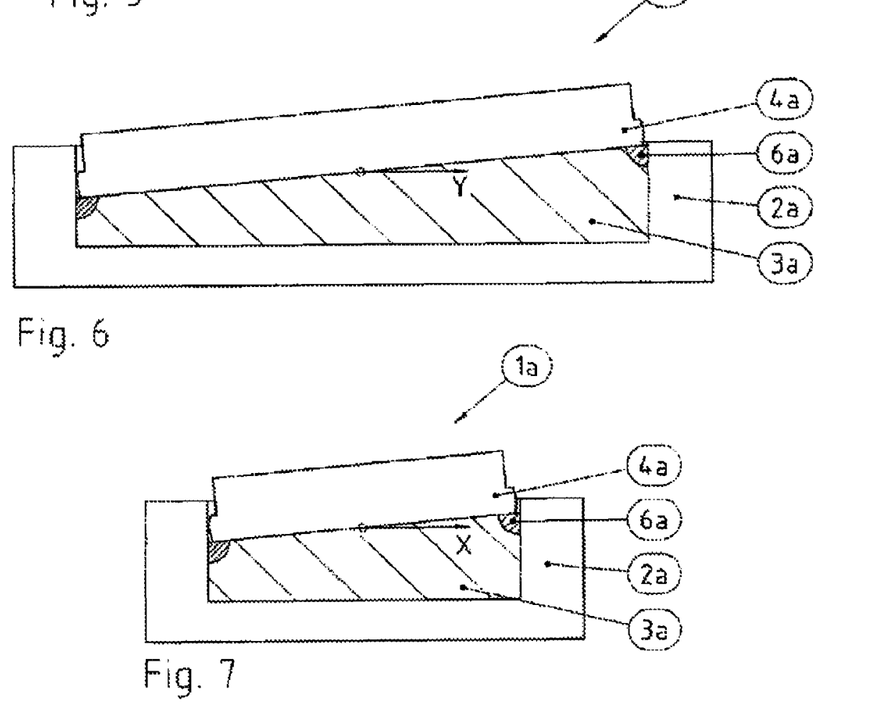

FIGS. 5, 6 and 7 illustrate a modification of pot bearing 1 shown in FIGS. 1 and 2, wherein pot 2a of pot bearing 1a has an oval shape, i.e. exhibits an oval cross section. Accordingly, elastomer cushion (elastomeric body) 3a also has an oval shape; and an oval seal 6a extends across the top edge of elastomer cushion 3a. During equal rotation ("tilting") around the X or Y axes, elastomer cushion 3a is compressed or worked to different extents because of the different lever arms; and the sliding distance of inner seal 6a against the pot is different. 4a denotes the cover of oval pot bearing 1a.

Figure 8:
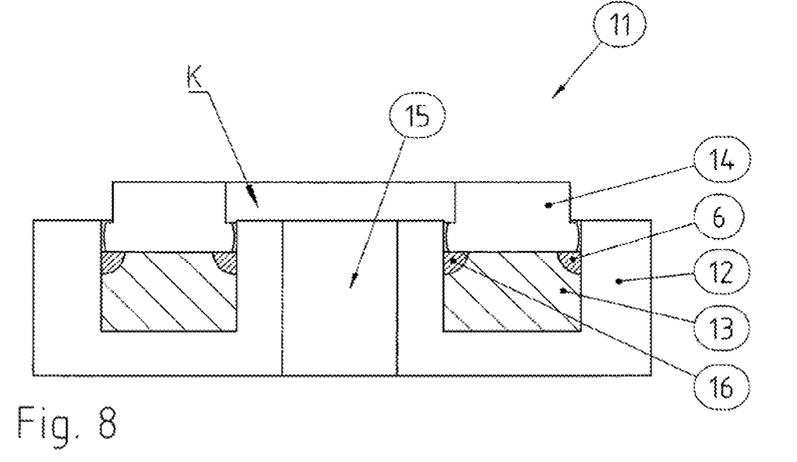
FIGS. 8 and 9 illustrate a modification of pot bearing 1 shown in FIGS. 1 and 2.
Figure 9:
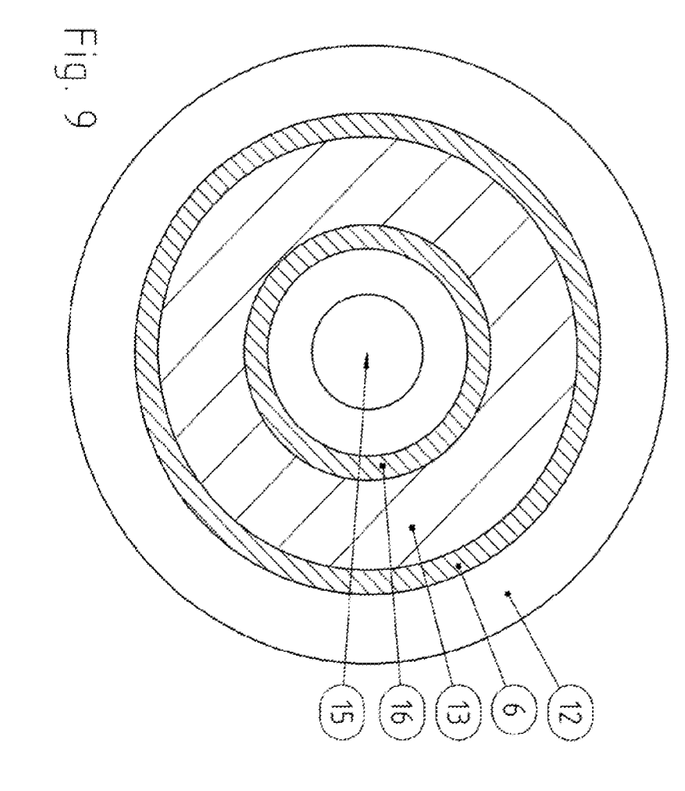

FIGS. 8 and 9, wherein FIG. 9 is again a top view from above of pot bearing 11 shown in vertical section in FIG. 8 with the cover removed, illustrate a modification of pot bearing 1 shown in FIGS. 1 and 2, wherein the pot has annular shape, i.e. constitutes an annular pot 12. Accordingly, the cover also has annular shape and constitutes an annular cover 14. Core structure K is hollow, i.e. is constructed in the form of a tube, so that pot bearing 11 has a passage 15. Bearing 11 is provided in addition to inner seal 6 with a further annular seal 16, which seals (annular) elastomer cushion 13 relative to tubular core structure K.

Figure 10:
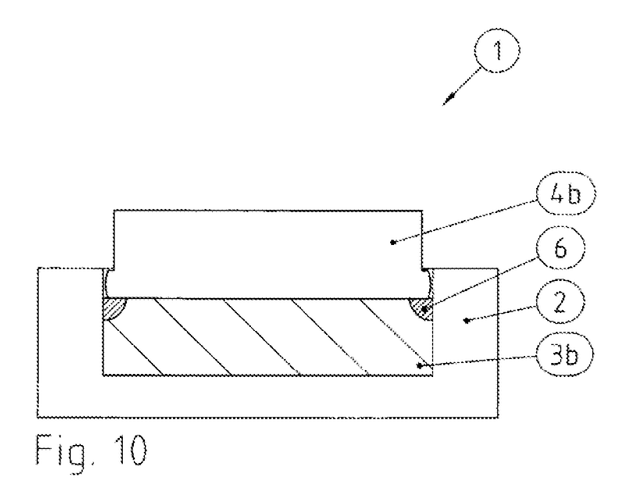
FIGS. 10 and 11 illustrate the possibility of compression of cover 4 under exertion of a reproducible pressure on elastomer cushion 3b, wherein the bearing is shown in the unloaded condition in FIG. 10 and in the loaded condition in FIG. 11
Figure 11:
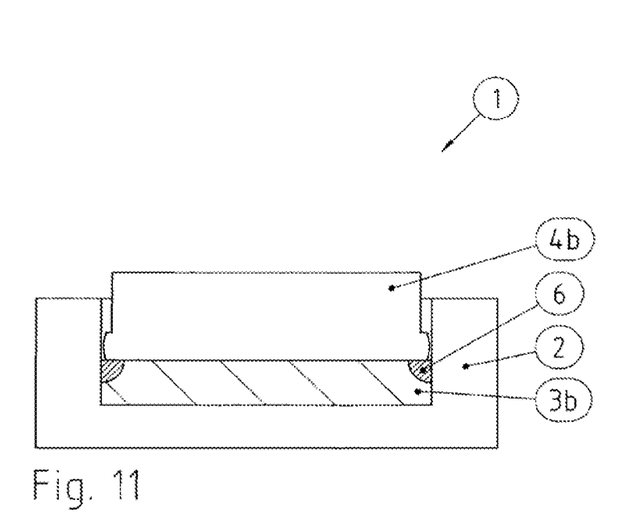

FIGS. 10 and 11 illustrate the possibility—under the high loads on pot bearing 1 coming into consideration here—of compression of cover 4 under exertion of a reproducible pressure on elastomer cushion 3b, wherein the bearing is shown in the unloaded condition in FIG. 10 and in the loaded condition (at a force per unit area of 120 N/mm² in the elastomer core) in FIG. 11. In order to take advantage of this effect technically, cover 4b has a greater height (thickness) than in the pot bearing according to FIG. 1.

What is claimed is:

1. A pot bearing (1) for absorbing rotations while imposing only small constraints, comprising:
   a pot (2, 2a, 12);
   an elastomer cushion (3, 3b, 13) accommodated therein; and
   a cover (4, 4b, 14) braced thereon and protruding at least partly into the pot,
   wherein a rim of the elastomer cushion (3, 3b, 13) is sealed slidingly relative to the pot (2, 2a, 12) underneath the cover by means of a circumferential inner seal (6), wherein the inner seal (6) consists at least predominantly of polyoxymethylene with a melt flow index (MFI 190/2.16) of smaller than 6 g/10 min.

2. The pot bearing of claim 1, wherein the permissible force per unit area of the elastomer cushion (3, 3b, 13) is greater than the standard value defined and tested according to DIN EN 1337/Part 5.

3. The pot bearing of claim 2, wherein the inner seal (6) seals with a force per unit area of the elastomer cushion (3, 3b, 13) up to 2 times the maximum standard value according to DIN EN 1337/Part 5.

4. The pot bearing of claim 1, wherein the permissible cumulative sliding distance of the inner seal (6) is greater than the standard value defined and tested according to DIN EN 1337/Part 5.

5. The pot bearing of claim 4, wherein the inner seal (6) absorbs a cumulative sliding distance as much as 1.6 times the maximum standard values according to DIN EN 1337/Part 5.

6. The pot bearing of claim 1, wherein the requirements according to DIN EN 1337/Part 5 are satisfied at temperatures of 40° C. to +50° C.

7. The pot bearing of claim 1, wherein the inner seal (6) is provided with silicone grease, at least in the region of the sealing face against the pot (2, 2a, 12).

8. The pot bearing of claim 7, wherein the silicone grease is a lithium-saponified silicone oil based on methyl phenyl silicone oil.

9. The pot bearing of claim 7, wherein the silicone grease has the following properties: drop point >200° C. according to DIN ISO 2176 or worked penetration of 20-35 mm, according to DIN ISO 2137 and/or flow pressure of <200 hPa at 20° C. according to DIN 51805 or oil separation of <1.5%, at 40° C. and 18 hours duration according to DIN 51817.

10. The pot bearing of claim 1, wherein the POM of the inner seal (6) has a tensile strength (EN ISO 527-2) of at least 62 N/mm2 or an elongation at break (EN ISO 527-2) of at least 45%.

11. The pot bearing of claim 1, wherein the inner seal (6) is vulcanized into or onto the elastomer cushion (3, 3b, 13).

12. The pot bearing of claim 1, wherein inner seal (6) is bonded by means of an adhesive to the elastomer cushion (3, 3b, 13).

13. The pot bearing of claim 1, wherein the inner seal (6) is vulcanized into an elastomer strip (7), which is placed around the elastomer cushion (3).

14. The pot bearing of claim 1, wherein different restoring moments are present around two horizontal axes (X, Y) orthogonal to one another.

15. The pot bearing of claim 14, wherein the pot (2*a*) has a non-round cross section.

16. The pot bearing of claim 1, wherein the elastomer cushion (13) is annular and surrounds a core structure (K).

17. The pot bearing of claim 16, wherein the core structure (K) is hollow.

18. The pot bearing of claim 17, wherein a mechanical component is passed through the bearing.

19. The pot bearing of claim 16, wherein the elastomer cushion (13) is sealed slidingly relative to the core structure (K) by means of a circumferential seal (16) wherein the seal (6) consists entirely or at least predominantly of polyoxymethylene with a melt flow index of smaller than 8 g/10 min.

20. The pot bearing of claim 1, further comprising an additional sliding face (G).

21. The pot bearing of claim 20, further comprising an additional guide.

22. The pot bearing of claim 1, wherein the annular gap present between the cover (4, 4*b*, 14) and the pot (2, 2*a*, 12) is protected against ingress of contaminants by means of a seal.

23. The pot bearing of claim 1 designed as a pin bearing, with which a chamber disposed in the pot underneath the elastomer cushion can be charged with curing filling compound via a filling channel.

24. The pot bearing of claim 1, wherein the circumferential seal comprises chain members linked with one another.

\* \* \* \* \*